United States Patent
Hightower

(10) Patent No.: US 9,707,480 B2
(45) Date of Patent: *Jul. 18, 2017

(54) WEARABLE DISPLAY SYSTEM AND METHOD

(71) Applicant: IGT, Las Vegas, NV (US)

(72) Inventor: Aaron Hightower, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/148,777

(22) Filed: May 6, 2016

(65) Prior Publication Data

US 2016/0325178 A1 Nov. 10, 2016

Related U.S. Application Data

(63) Continuation of application No. 14/663,099, filed on Mar. 19, 2015, now Pat. No. 9,339,732, which is a continuation of application No. 13/627,838, filed on Sep. 26, 2012, now Pat. No. 8,992,318.

(51) Int. Cl.

| | | |
|---|---|---|
| *A63F 13/25* | (2014.01) | |
| *G02B 27/01* | (2006.01) | |
| *A63F 13/30* | (2014.01) | |
| *G06F 3/048* | (2013.01) | |
| *G07F 17/34* | (2006.01) | |
| *G09G 5/36* | (2006.01) | |
| *G02B 27/00* | (2006.01) | |
| *G07F 17/32* | (2006.01) | |

(52) U.S. Cl.
CPC .............. *A63F 13/25* (2014.09); *A63F 13/12* (2013.01); *G02B 27/017* (2013.01); *G06F 3/048* (2013.01); *G07F 17/3209* (2013.01); *G07F 17/3211* (2013.01); *G07F 17/3213* (2013.01); *G07F 17/3246* (2013.01); *G07F 17/3248* (2013.01); *G07F 17/34* (2013.01); *G09G 5/363* (2013.01); *G02B 27/0093* (2013.01); *G02B 2027/014* (2013.01); *G02B 2027/0178* (2013.01); *G02B 2027/0187* (2013.01); *G07F 17/3218* (2013.01); *G09G 2354/00* (2013.01); *G09G 2360/10* (2013.01); *G09G 2360/127* (2013.01)

(58) Field of Classification Search
USPC .............................................. 463/30, 31, 32
See application file for complete search history.

(56) References Cited

U.S. PATENT DOCUMENTS

| | | | |
|---|---|---|---|
| 2010/0103075 A1 | 4/2010 | Kalaboukis et al. | |
| 2013/0194389 A1* | 8/2013 | Vaught .................. | G02B 27/017 348/47 |

* cited by examiner

*Primary Examiner* — Pierre E Elisca
(74) *Attorney, Agent, or Firm* — Neal, Gerber & Eisenberg LLP

(57) ABSTRACT

A wearable display device, system and method are described. The display system includes a wearable display to be worn by a person; a display buffer to receive display data from a graphics engine, which data includes data regarding position of a wearer in a virtual environment; a display processor unit to process vision direction data using the display data from the graphics engine, wherein the display processor unit sends the display data to the wearable display. In an example, the display system is a component to a gaming system or environment.

16 Claims, 10 Drawing Sheets

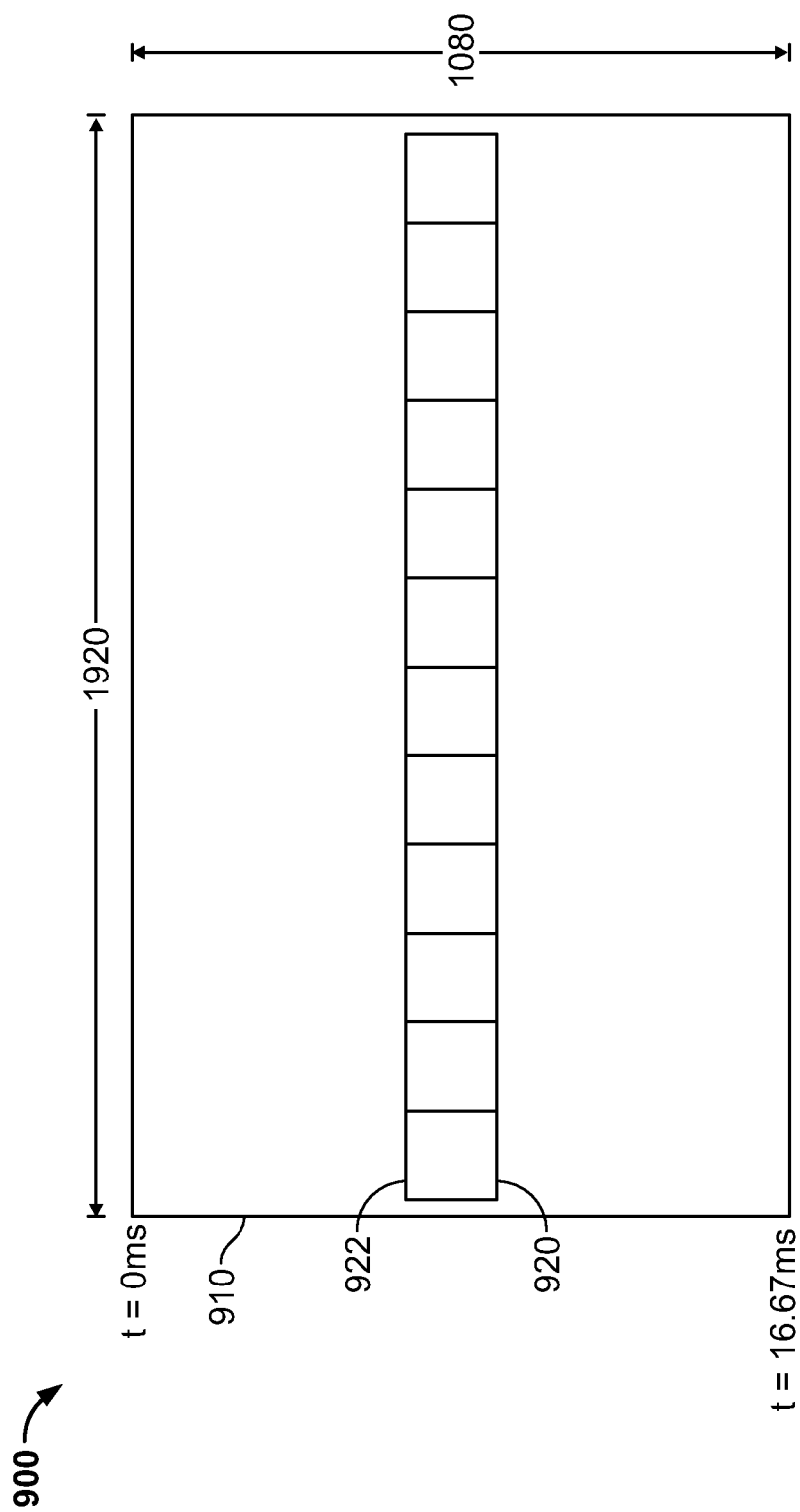

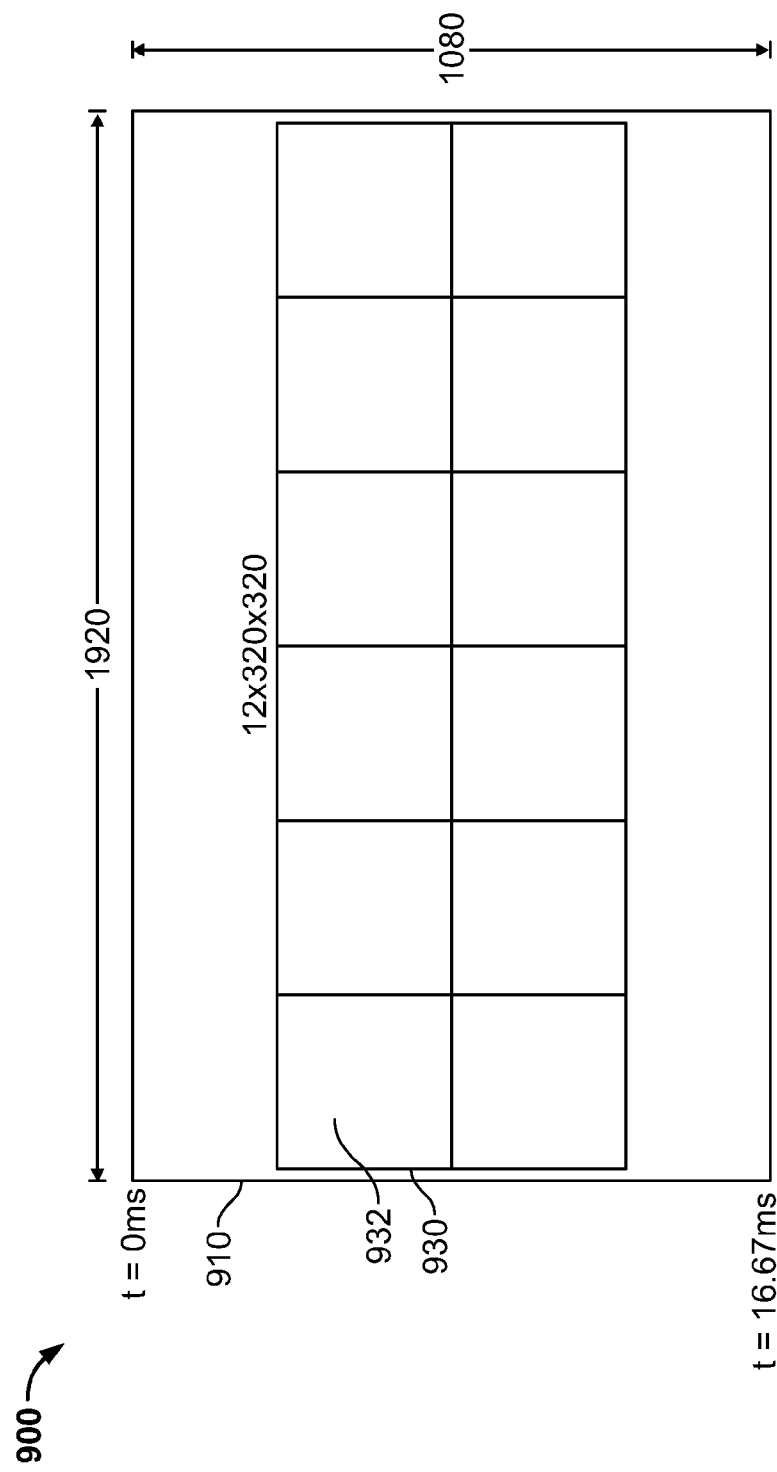

WEARABLE DISPLAY SYSTEM AND METHOD

PRIORITY

This application is a continuation of, and claims priority and benefit of U.S. patent application Ser. No. 14/663,099, filed on Mar. 19, 2015, which is a continuation of, and claims priority and benefit of, U.S. patent application Ser. No. 13/627,838, filed on Sep. 26, 2012, now U.S. Pat. No. 8,992,318, issued on Mar. 31, 2015.

FIELD

Various embodiments described herein relate to a wearable display system and method, and more particularly to head mounted display systems and methods.

BACKGROUND

Computer generated, interactive environments have been proposed to augment reality. However, due to various issues such interactive environments have not been widely accepted. One reason for this is the artificial nature of such environments as perceived by the person interacting with the environment. The person interacting with the environment may find the environment too artificial based on the way the person perceives the artificial environment.

SUMMARY OF THE DESCRIBED EMBODIMENTS

A wearable display system is described. In an example, the wearable display system includes a wearable display to be worn by a person, a display buffer to receive display data from a graphics engine, which data includes data regarding position of a wearer in a virtual environment, a display processor unit to process vision direction data using the display data from the graphics engine, wherein the display processor unit sends the display data to the wearable display. In an embodiment, the wearable display includes a left display and a right display, wherein the wearable display is to be worn by a wearer with the right display in field of view a right eye of wearer and the left display in field of view a left eye of wearer. In an embodiment, the display buffer includes at least a first sub-buffer and a second sub-buffer for the left display and at least a third sub-buffer and a fourth sub-buffer for the right display. In an embodiment, the first sub-buffer is to provide display data to the left display and release the second sub-buffer to be updated at a first time, and wherein the second sub-buffer is to provide display data to the left display and release the first sub-buffer to be updated at a second time.

In an embodiment, the display processor unit is to control a change from the first time to the second time using a movement signal from a direction tracking unit.

In an embodiment, the display processor unit includes direction tracker with a direction tracking rate, and wherein a display data rate provides data from the display buffer to the display and is about equal to or greater than the direction tracking rate.

In an embodiment, the display includes a refresh rate that is about equal to the direction tracking rate.

In an embodiment, the display includes a refresh rate that greater than the direction tracking rate.

In an embodiment, which can be combined with any of the preceding embodiments, the direction tracking unit is to track direction in three or greater axis.

In an embodiment, which can be combined with any of the preceding embodiments, the display processor unit operates at at least 600 HZ, and wherein the display buffer receives data from a graphics engine at less than or 120 HZ.

In an example, a gaming system includes a gaming computing device, a graphics processing unit to provide location of a user in a virtual gaming environment, and a wearable display unit operably connected to the gaming computing device and being wearable by the user. The wearable display can include any of the above described features. In an example, the display unit includes a wearable display to be worn by a person, a vision direction tracking unit to detect the direction of vision by the person, a display buffer to receive display data from the graphics processing unit, which display data includes data regarding position of the user in the virtual gaming environment, and a display processor to process vision direction data using the display data from the graphics processing unit, wherein the display processor sends the display data to the wearable display.

In an embodiment, the gaming system wearable display includes a left display and a right display, wherein the wearable display is to be worn by a user with the right display in field of view a right eye of user and the left display in field of view a left eye of user.

In an embodiment, the gaming system display buffer includes at least a first sub-buffer and a second sub-buffer for the left display and at least a third sub-buffer and a fourth sub-buffer for the right display.

In an embodiment, the first sub-buffer is to provide display data to the left display and release the second sub-buffer to be updated at a first time. In an embodiment, the second sub-buffer is to provide display data to the left display and release the first sub-buffer to be updated at a second time.

In an embodiment, the gaming system display processor is to control a change from the first time to the second time using a movement signal from the vision direction tracking unit.

In an embodiment, the gaming system display processor includes a display data rate that provides data from the display buffer to the display, and wherein the display data rate is about equal to or greater than the direction tracking rate.

In an embodiment, the gaming system display includes a refresh rate that is about equal to the direction tracking rate.

In an embodiment, the gaming system display includes a refresh rate that greater than the direction tracking rate.

In an embodiment, the gaming system direction tracking unit is to track direction in three or greater axis.

In an embodiment, the gaming system display processor unit operates at at least 600 HZ, and wherein the display buffer receives data from a graphics engine at less than or 120 HZ.

In an embodiment, the gaming computing device is to provide gaming data that is placed into the virtual environment by the graphics processing unit.

In an embodiment, the graphics processing unit includes an input separate from the wearable display unit to control a position of the user in the virtual environment.

In an embodiment, the vision direction tracking unit tracks movement of the user's eyes.

In an embodiment, the vision direction tracking unit tracks movement of the user's head on which the wearable display unit may be worn.

In an embodiment, the wearable display unit includes an accelerometer that is to detect the position and the movement of the user's head with when the wearable display unit is worn by a user.

BRIEF DESCRIPTION OF THE DRAWINGS

The embodiments will be readily understood by the following detailed description in conjunction with the accompanying drawings, wherein like reference numerals designate like structural elements, and in which:

FIG. 9A shows an example of a 3D cube map placed into a frame buffer, according to an example embodiment.

FIG. 9B shows another example of a 3D cube map placed into a frame buffer, according to an example embodiment.

DETAILED DESCRIPTION

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

Figure 1:
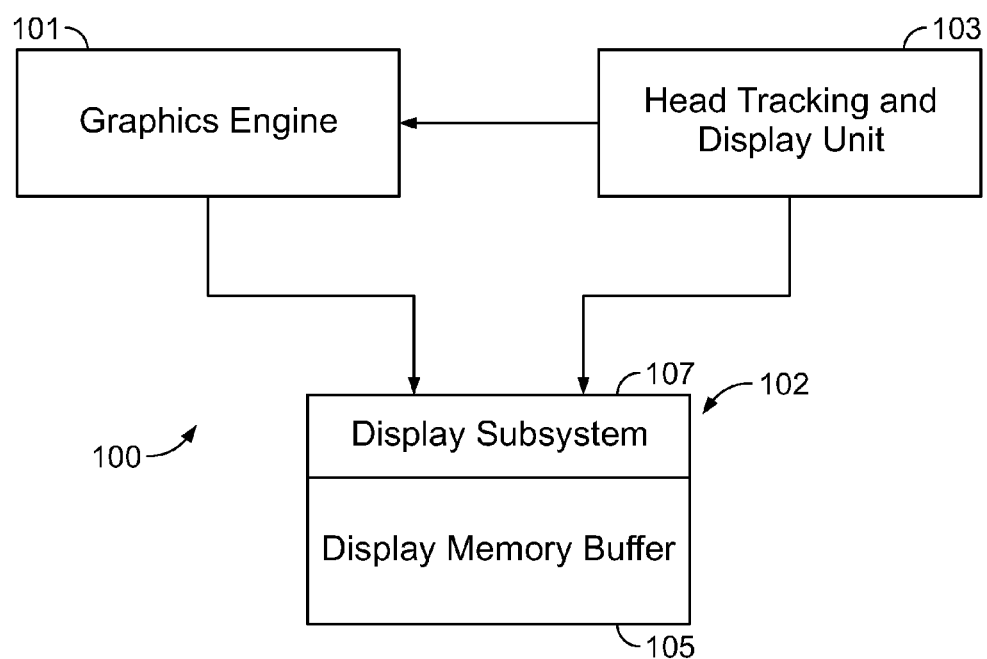
FIG. 1 is a schematic diagram of a display system, according to an embodiment of the invention.

FIG. 1 shows a schematic diagram of a display system 100, according to an embodiment of the invention. The display system 100 is configured to be worn by a person and provides the person with a virtual reality visual experience, e.g., for gaming, for console computer games, for personal computer games, or form other environments that the wearer would like to virtually experience. Display system includes a graphics engine 101, display circuitry 102 and a head tracking and display unit 103. In an example, both the head tracking and display unit and the display circuitry 102 are provided onboard the physical form factor or wearable structure that will be worn by the person using the virtual environment. The graphics engine 101 can be a computing device that is in electrical communication with the display circuitry 102 and, hence, in some embodiments can be remote from the structure being worn on the head of the wearer, e.g., the graphics engine 101 is remote from the display circuitry. The graphics engine 101 processes the image data using circuitry. The graphics engine 101 includes processors and on-board memory typically optimized for graphics processing. Examples of graphics engines include Quadro® FX by NVIDIA of Santa Clara, Calif. The graphics engine 101 can include low-level software that interacts with the hardware, to display a scene. In an example, the graphics engine can process animation sequences by computing the pixels to display, and then request send the animation sequence data to be displayed to the display subsystem. The graphics engine can determine animation of objects in the visual field of the wearer based on tracking information sent from the head tracking and display unit 103. The graphics engine can further calculate and output texture, lighting, rendering, zooming, panning, clipping, or any combination thereof of the animation sequence for the virtual reality to be displayed at unit 103. However, relying only on the graphics engine 101 to provide the data directly to the display unit 103 has resulted in less than favorable experiences for the wearer of the display unit 103 as the data for display to the wearer would lag behind the movement of the wearer's head. To solve this problem and possibly provide other benefits, the display data that is processed by the graphics processor is sent to display circuitry 102.

The display circuitry 102 includes a display buffer 105 to receive display data from graphics engine 101. The display data includes data regarding position of a wearer in a virtual environment and the virtual environment. The virtual environment can be stored in a cube map. The display buffer 105 includes at least a first sub-buffer and a second sub-buffer for the left display and at least a third sub-buffer and a fourth sub-buffer for the right display. The first sub-buffer is to provide display data to the left display and release the second sub-buffer to be updated at a first time. The second sub-buffer is to provide display data to the left display and release the first sub-buffer to be updated at a second time. The third sub-buffer is to provide display data to the right display and release the fourth sub-buffer to be updated at a first time. The fourth sub-buffer is to provide display data to the right display and release the third sub-buffer to be updated at a second time. All of the sub-buffers are updated with data from the graphics engine 101.

The display buffer 105 and, hence, its sub-buffers, can store the visual data as cube maps instead of rectangular maps. The display circuitry 102 uses two cube maps (one for each eye) to represent the data about the display. These cube maps are created by mapping a sphere on to a cube thereby giving a closer three-dimensional feel to the display. Two versions of the cube maps are stored in the respective left and right sub-buffers. One is used to the provide data to display on the display unit 103. The other cube map can be updated by the graphics engine.

Display circuitry 102 further includes a display processor 107 to process vision direction data using the display data from the graphics engine 101. The display circuitry 102, e.g., the display processor unit 107 sends appropriate display data to the wearable display unit 103.

The display circuitry 102, e.g., a processor, is to control a change from the first time to the second time using a movement signal from a direction tracking unit such as the head tracking circuitry of the unit 103.

The head tracking and display unit 103 and the display circuitry 102 can both be on the structure being worn by the user and can communicate with the graphics engine, which can be remote from the structure being worn on the user's head.

The head tracking and display unit 103 is configured to be worn by the user. The display unit 103 includes a left display for the wearer's left eye and a right display for the wearer's right eye. That is, the unit 103 is a wearable display that is to be worn by a wearer with the right display in field of view a right eye of wearer and the left display in field of view a left eye of wearer. The displays can be light emitting diode displays, organic light emitting diode displays, liquid crystal displays, plasma displays or projection type displays that show the images in such a way to be visible to the wearer of the unit 103 and, in an example, to not be visible to others. Unit 103 includes head tracking circuitry that determines the movement of the wearer, e.g., if the wearer turns his/her head. The head tracking circuitry can include an accelerometer or other motion sensors. Head tracking circuitry tracks movement of the wearer's head, e.g., at a direction tracking rate. Head tracking circuitry can track the wearer's motion in at least two directions and in an example in three or greater axes.

In an example, the display buffer 105 and, hence, the display circuitry 102, provide display data to the display unit 103 at a display data rate that is about equal to or greater than the direction tracking rate.

The display unit 103 includes a display data rate for the displays that is about equal to or greater than the direction tracking rate. In an example, the display includes a refresh rate that is significantly greater than the direction tracking rate.

The position information of the wearer of the display system 100 being provided to the intermediate stage of the display circuitry 102 as well as the graphics engine 101 will provide a lower latency to display of any frame or pixel. That is, the display circuitry can estimate the current position of the wearer using past head-tracking information as well as providing a shorter path and less processing to identify the location information with the display data being provided from the display circuitry 102. As a result, errors in the colors of the pixels at the time of illumination is reduced. In an example, the latency can be reduced in single-digit nanoseconds (1-9 ns) as opposed to double-digit milliseconds (e.g. 16.66 ms) may be provided by the current systems. Such accurate tracking information is important to reducing errors in the display when the user moves his/her head. This low latency tracking information can correct for many errors that merely providing more display data (pixels) may not correct.

The display circuitry 102 operates as an intermediate graphics buffer system that stores information corresponding to the visual to be presented on the display 102. This display image buffer 105 of the display circuitry can be constantly refreshed by the graphics engine but is independent of the refresh rate of the display on the wearable (e.g., head mounted) display unit 103. As a result, each time a user turns his head, the data is pulled from the intermediate display buffer 105 instead of from the graphics engine that must refresh the entire display. Additionally, the intermediate graphics buffer uses cube maps instead of rectangular maps to store the information. Since the data in the virtual environment, represented in three-dimensions using the cube maps does not change as much as the perspective of the user in the virtual environment, it makes sense to refresh the user's view more frequently than to refresh the actual data.

In an example, the display processor 107 operates at at least 600 HZ, and wherein the display buffer receives data from a graphics engine at less than or equal to about 240 HZ or less than or equal to about 120 HZ (+/−10 HZ).

Figure 2:
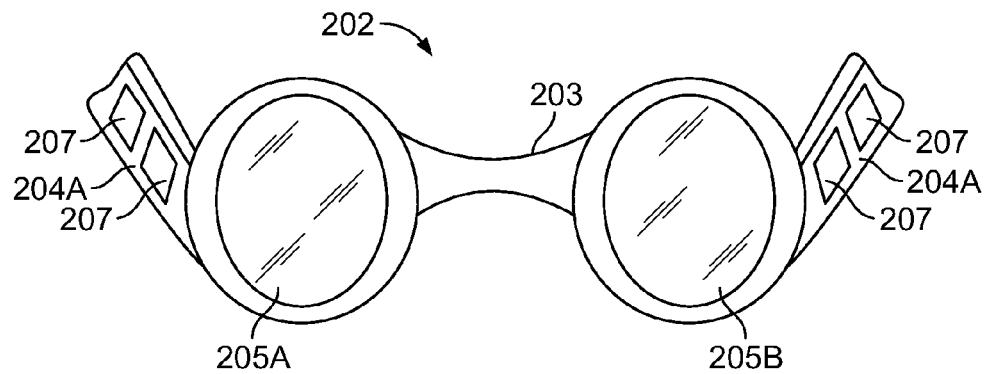
FIG. 2 shows a wearable display device, according to an example embodiment.

FIG. 2 shows a wearable display device 202, according to an example embodiment. The wearable device 202 includes a frame 203 to support the right eye display 205A and the left eye display 205B. Arms 204A and 204B extend out from the frame 203 and act to hold the displays 205A, 205B in place on the head of the wearer. Circuitry 207 is mounted on the arms 204A, 204B. Circuitry 207 includes the display buffer(s) and the display processor(s) as described herein. The circuitry 207 is in electrical communication with a graphics engine, which is not part of the circuitry 207 in the illustrated example. In another example, the graphics engine is mounted to the arms. The circuitry 207 can operate to process the visual data being displayed on the right and left displays as described herein.

Figure 3:
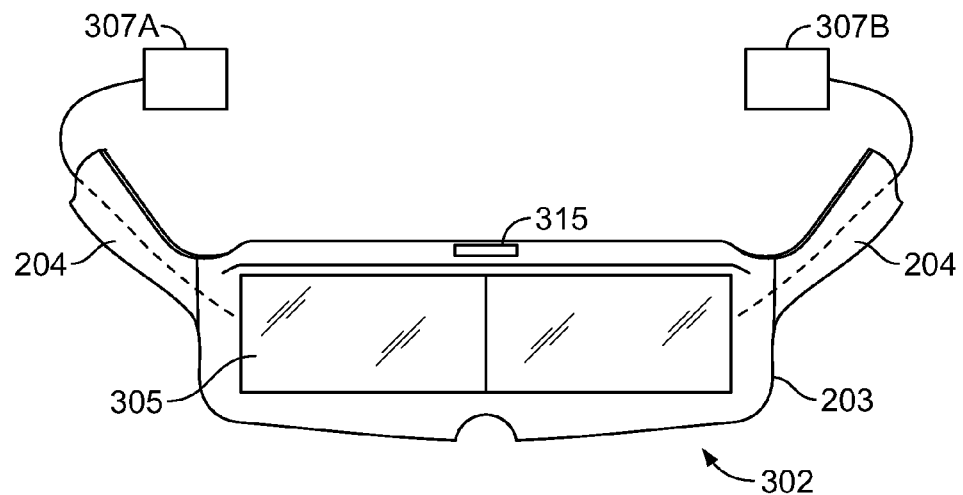
FIG. 3 shows a wearable display device, according to an example embodiment.

FIG. 3 shows a wearable display device 302, according to an example embodiment. The wearable display device 302 is similar to the display device 202 (FIG. 2) except device 302 has a differently shaped frame 203 and a unitary display 305 that is divided into left and right display areas to be placed in front of the left and right eye of the wearer when the display device 302 is worn. The unitary display 305 is held in the frame 203 that can be held on the user's head by arms 204 that extend on the side of the wearer's head and may extend over the ears of the wearer. It will be within the scope of the present disclosure to modify the structures holding the displays in front of the wearer's eyes. Such modifications can include over the crown of the head arms, straps, bands, helmets, and the like. A movement tracking circuitry 315 is mounted to the frame 203 to track the movement of the wearer's head. This tracking information is provided to circuitry 307A, 307B that is located off the frame. Circuitry 307A, 307B can include the display processor and associated buffers as described herein. Circuitry 307A, 307B is off the frame 203 but is in electrical communication with the display 305 to provide video information to the displays. In an example. The off frame circuitry 307A, 307B can communicate with the display 305 over a wired connection. In the illustrated example, left and right wire connections connect circuitry 307A, 307B to the left and right sides of display 305, respectively. In another example, a single wire connection can connect the circuitry to the display 305. The communication from the circuitry 307 to the display can also be down through a wireless connection, e.g., the Bluetooth standard.

In addition to using cube-map representation of the scene, the cube-map data can be encoded into a smaller portion of the total display buffer being output by the video card in order to reduce the latency for transmitting an entire frame of data. In one example embodiment, there is a cube-map for each eye. Each cube has six sides so for the right view and the left view there will be two cube maps, having a maximum of 12 squares of visual data for a complete scene for both eyes. These 12 squares of data can be arranged in the 2-dimensional space of the video cards buffer in any number of different ways. Generally, there is a tradeoff between reduced latency and increased resolution. For maximum resolution at all sides of each cube, the display buffer will be four squares wide by three squares high filling as much real estate as possible on the frame. Of course, this maximum resolution will also be maximum latentency.

Figure 9C:
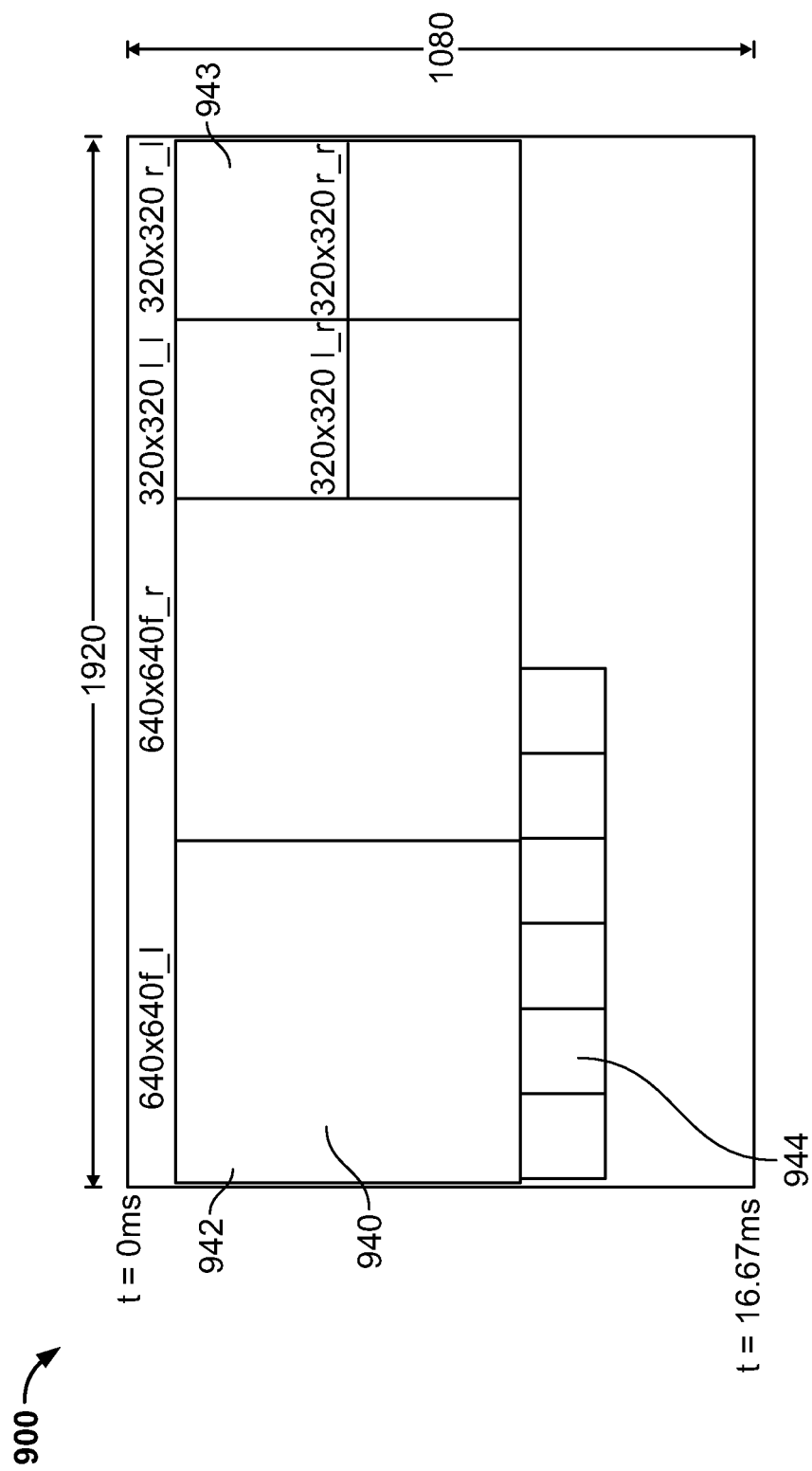
FIG. 9C shows an example of a 3D cube map having squares with varying resolutions placed into a frame buffer, according to an example embodiment.

FIGS. 9A, 9B, and 9C show several different ways that the 12 squares can be arranged on less than the full frame 910. The full size frame size is 1920 pixels wide by 1080 pixels high in the examples shown in FIGS. 9A, 9B, and 9C. FIGS. 9A, 9B, and 9C show some examples of how the 3D cube map would be placed into the frame buffer including the idea that the cube map could be positioned into a different part of the frame buffer in order to accomplish the goal of reducing latency of transfer to the graphics engine. FIG. 9A shows a cube map 920 where the twelve squares 922 are substantially the same size. Each of the squares 920 of data has a resolution of 160 pixels by 160 pixels. These squares 920 of data fit in one row across the frame 910 and use approximately fifteen percent of the pixels of the full frame 910. Therefore, this has a lower resolution and lower latency time than the example given which uses most of the full frame 910.

FIG. 9B shows a cube map 930 where the twelve squares 932 are substantially the same size. Each of the squares 930 of data has a resolution of 320 pixels by 320 pixels. These squares 932 of data fit in one row across the frame 910 and use approximately sixty three percent of the pixels of the full frame 910. Therefore, this cube map has a higher resolution and longer latency time than the example shown in FIG. 9A. However, the resolution is still lower and the latency is less than the other example spoken of above which uses most of the full frame 910.

Unlike a traditional display, this display that is used on one example embodiment, will accept both variable frequency and variable resolution image data from the 3d application. What is fixed by the output is the number of pixels per second that are arriving from the video card. But the size of each square representing on face of a cube map can change from one from to the next as can the frequency at which it is being provided. In general, the faster the refresh rate, the lower the resolution as there is a fixed frequency at which pixel data can be sent from the video card.

FIG. 9C shows a cube-map 940 where the twelve squares 942, 943, 944 are different sizes. This type of cube-map is usable on the display discussed above which accepts both variable frequency and variable resolution image data from a 3d application. This cube-map 940 recognizes that the resolution of some squares may not be as important to the viewer. For example, the resolution of the squares of the cube behind the viewer may be rarely viewed and so therefore can be of much lower resolution (such as square 944) than other squares which can be located directly in front of the viewer 942. The squares 942 of data have a resolution of 640 pixels by 640 pixels. The squares 943 of data have a resolution of 320 pixels by 320 pixels. The squares 944 of data have a resolution of 160 pixels by 160 pixels. The various sized squares of data fit into the frame 910 as shown and use approximately seventy five percent of the pixels of the full frame 910. Therefore, portions of this cube-map 940 have a higher resolution and other portions have a lower resolution. The latency time of this example will be lower than the example spoken of above which uses most of the full frame 910.

In one example embodiment, the presentation of the graphics to the user's eye is locked to match the frequency at which the data is arriving from the computer system that is providing the 3d cube map data to the displays. Even if the frequency drops to a lower rate, there are advantages to a lower yet variable refresh rate that is synchronized to the data rate coming from the computer. In a locked system, the user's ability to eye track moving objects with visual artifacts is facilitated. Any object moving in a linear fashion depicting linear motion be less likely to be compromised.

This gives us the ability to have the computer provide exactly one frame of data directly to the user at a variable frequency according to how fast the computer can process the scene, and allow the physical display presented to the user to synchronize to that frequency. There may be a resolution tradeoff to allow the computer system to provide the higher frequency. However, the motion portrayal would be superior in this mode.

So, even if the computer is displaying a 2560×1600 resolution frame buffer at 120 frames per second, the 491.5 million (nearly half a billion) pixels received every second can be mapped in many different ways. The different ways can be chosen and the various tradeoffs balanced. In one embodiment, a special format may be recognized by the display by encoding data in specific areas of the display output. For a higher resolution (static) 3d environment, it may take multiple frames to receive the entire environment with each cube face taking the entire frame buffer, and the user can be immersed in a very high resolution environment where there is little to no movement in that environment.

But another environment may have fast moving objects that they user is following with head and eye tracking movements, and the portrayal of accurate space-time positioning with as many sample points as possible is of more concern.

The ideal system could allow the host computer system to smoothly and seamlessly transition from these two types of environments (high resolution cube maps versus high frame rate cube maps) as the content creator deems necessary. And of course the resolution of the frame buffer transfer of pixel data from the host computer to the display remains the same. The format at which the data is transferred in the frame buffers from the host computer to the display can change from one frame to the next. This necessitates encoding of data into the frame buffer to direct the display into the modes necessary for this variable cube-map-resolution and cube-map-frequency to work.

FIGS. 9A, 9B, and 9C can be looked viewed to explain many concepts including that each of those squares may be variable resolution according to the applications desire for detail in various directions (for example, the rear facing portion or portions of other cube faces may even be omitted). In addition, the positioning of the squares in the frame may vary according to the exact position of the raster at the time the 3D application has completed the rendering of the buffers to minimize latency. Although not shown in the diagrams, it should be noted that additional digital data in the output color buffers (EG: least significant bits of invisible data) directs the special-purpose display with respect to which squares belong to which eye and which face of the cube map. This facilitates flexibility for where resolution and frequency of updates is most needed by the application.

Figure 4:
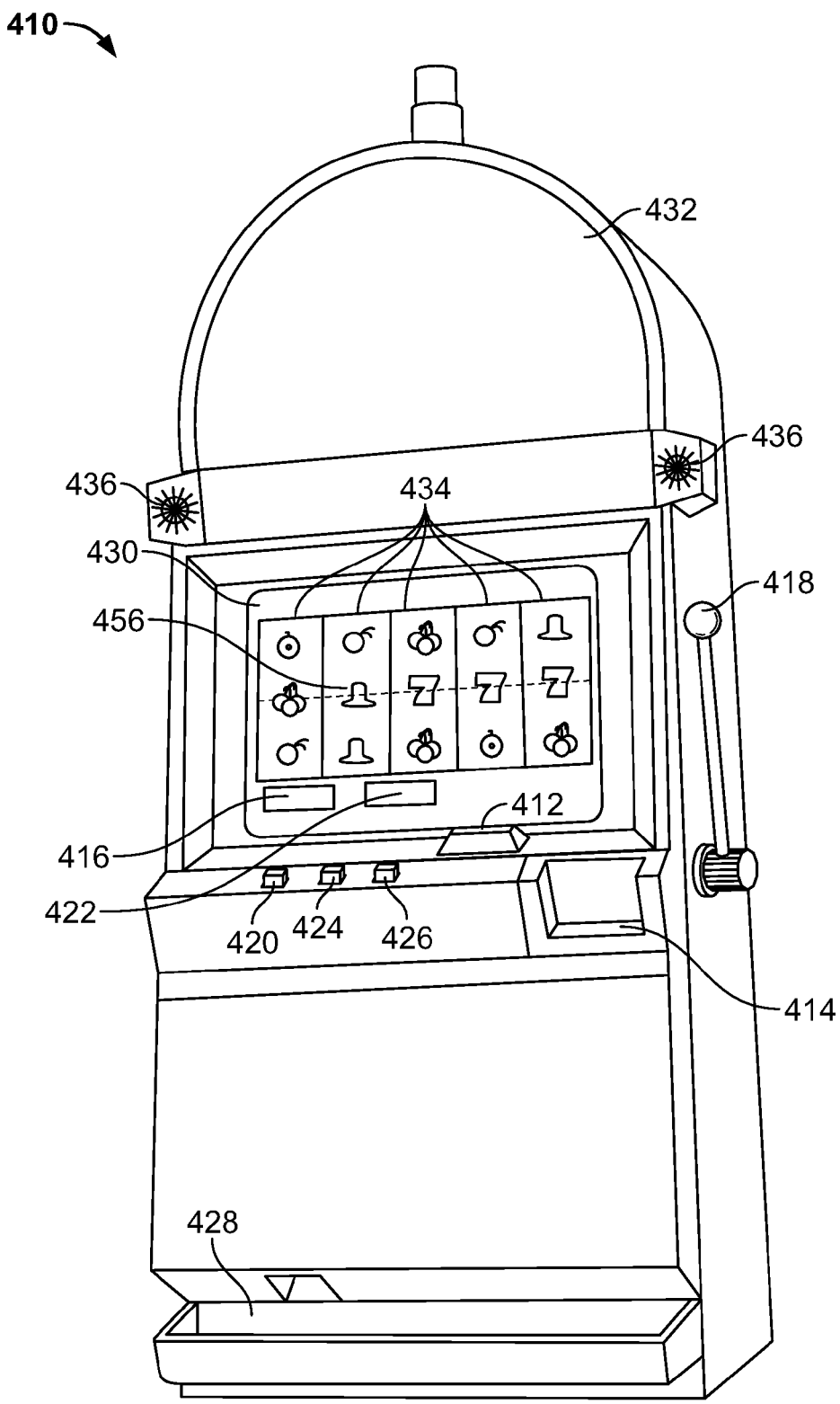
FIG. 4 is a view of a gaming device, according to an embodiment of the invention.

FIG. 4 shows schematic diagram of a gaming device 400, according to an embodiment of the invention. Gaming device 400 is a slot machine having the controls, displays and features of a conventional slot machine. It is constructed so that a player can operate it while standing or sitting, and gaming device 400 can be mounted on a console. However, it should be appreciated that gaming device 400 can be constructed as a table-top game (not shown) which a player can operate preferably while sitting. Furthermore, gaming device 400 can be constructed with varying cabinet and display designs. Gaming device 400 can also be implemented as a program code stored in a detachable machine-readable or computer readable storage that stores instructions for operating a hand-held video game device or other gaming device. Also, gaming device 400 can be implemented as a program code stored on a disk or other memory device which a player can use in a desktop or laptop personal computer or other computerized platform. Such memories can include tangible memory structures. Gaming device 400 can incorporate any primary game such as slot, poker or keno, any of their bonus triggering events and any of their bonus round games. The symbols and indicia used on and in gaming device 400 may be in mechanical, electrical or video form.

The gaming device 400 includes a coin slot 412 and bill acceptor 414 where the player inserts money, coins or tokens. The player can place coins in the coin slot 412 or paper money or ticket vouchers in the bill acceptor 414. Other devices could be used for accepting payment such as readers or validators for credit cards or debit cards. When a player inserts money in gaming device 400, a number of credits corresponding to the amount deposited is shown in a credit display 416. After depositing the appropriate amount of money, a player can begin the game by pulling arm 418 or pushing play button 420. Play button 420 can be any play activator used by the player which starts any game or sequence of events in the gaming device.

Gaming device 400 also includes a bet display 422 and a bet one button 424. The player places a bet by pushing the bet one button 424. The player can increase the bet by one credit each time the player pushes the bet one button 424. When the player pushes the bet one button 424, the number of credits shown in the credit display 416 decreases by one, and the number of credits shown in the bet display 22 increases by one.

At any time during the game, a player may "cash out" and thereby receive a number of coins corresponding to the number of remaining credits by pushing a cash out button 426. When the player "cashes out," the player receives the coins in a coin payout tray 28. The gaming device 410 may employ other payout mechanisms such as credit slips redeemable by a cashier or electronically recordable cards which keep track of the player's credits.

Gaming device 400 also includes one or more display devices. The embodiment shown in FIG. 4 includes a central display device 430 as well as an upper display device 432. Gaming device 400 preferably displays a plurality of reels 434, e.g., three to five reels, in mechanical form or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 434 are in video form, the display device for the video reels 434 is preferably a video monitor.

Each reel 434 displays a plurality of indicia such as bells, hearts, fruits, numbers, letters, bars or other images which preferably correspond to a theme associated with the gaming device 40. Furthermore, gaming device 400 preferably includes speakers 436 for making sounds or playing music. It will be understood to be within the scope of the present disclosure that other indicia can be used, e.g., space themes, movie themes, sports themes, etc.

The gaming machine 400 as whole can be rendered and displayed on the wearable display as described herein, e.g., FIGS. 1-3 and related text. The gaming machine 400 appears on the display that is worn by the player. In another example, display of the gaming device 400 is actually shown on the display of the wearable unit. In yet a further example other inputs to the gaming device are show on the display of the wearable display.

Figure 5:
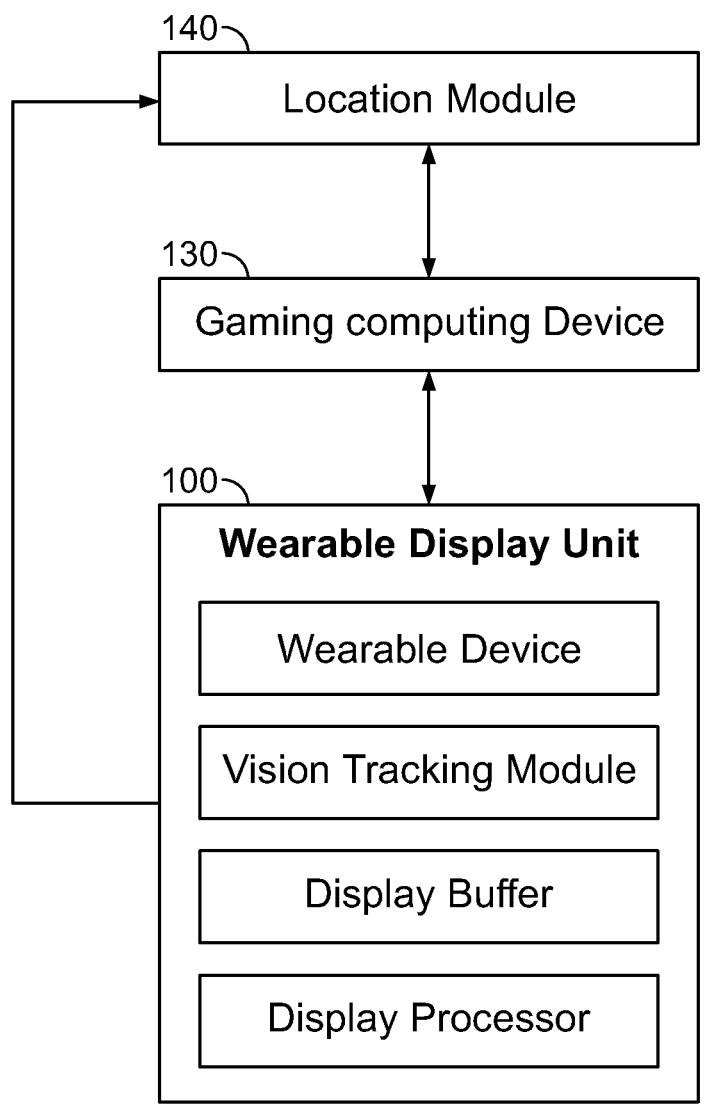
FIG. 5 is a view of a gaming computing system, according to an embodiment of the invention.

FIG. 5 shows a gaming system including the wearable display unit 100, a gaming computing device 130 and a location module 140. The gaming computing device 130 can be a gaming server that tracks game play. The location module 140 received data from the wearable display unit 100 or other input from the wearer of the wearable display unit 100 to determine the virtual location of the wearer in the virtual environment. The location module 140 provides this information to the game server or gaming computing device 130, which provides additional visual data and gaming data to the wearable display unit 100.

Figure 6:
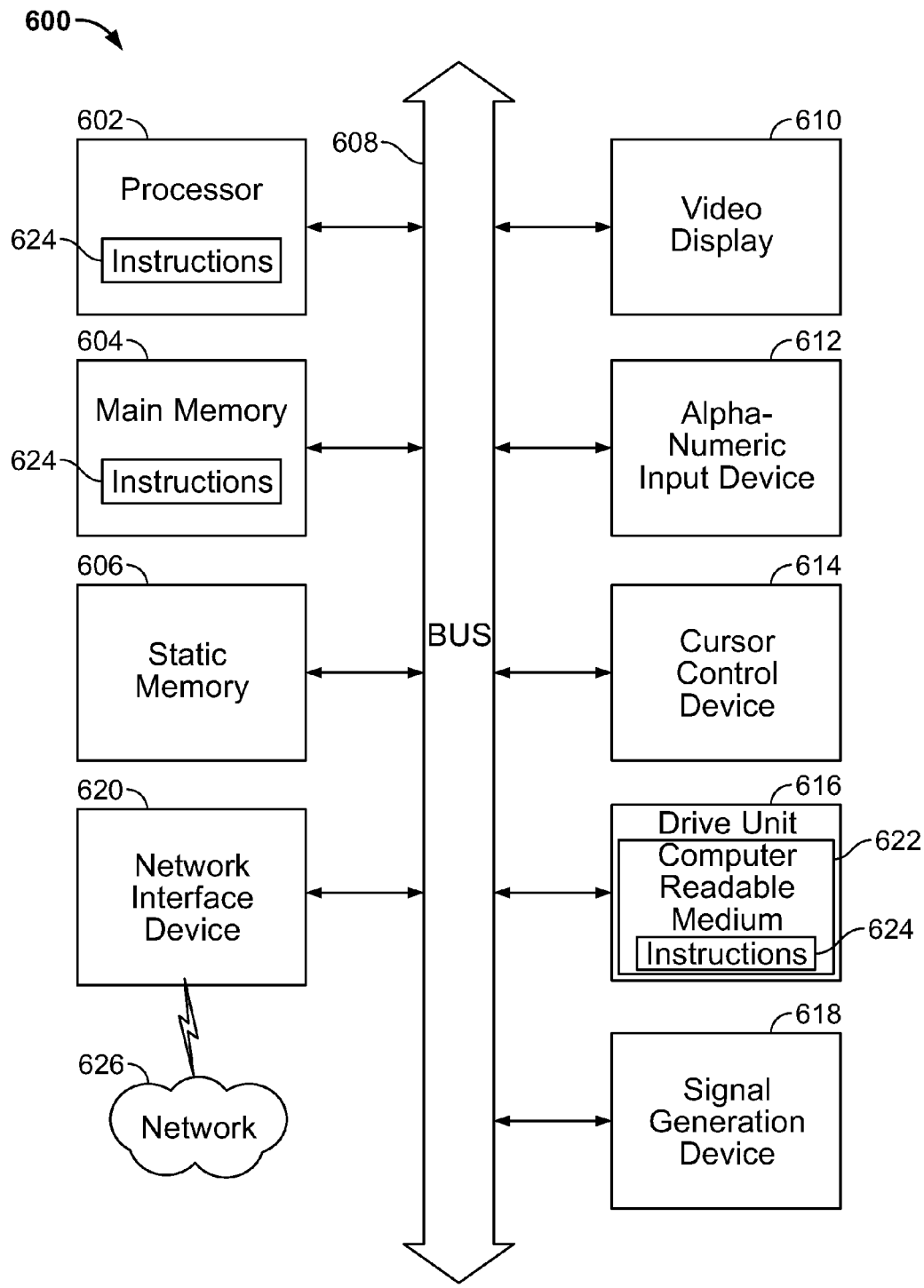
FIG. 6 shows a computing system that can be used, in whole or in part with the wearable display device or the gaming system, according to an example embodiment.

FIG. 6 shows a computing system that can be used, in whole or in part, for structures in the gaming system 150 or the display system 100. FIG. 6 shows a diagrammatic representation of machine in the example form of a computer system 600 within which a set of instructions may be executed causing the machine to perform any one or more of the methods, processes, operations, or methodologies discussed herein and while described hereafter as a single computer system, it will be understood that the process and structures performing those processes may operate on or more computer systems 600.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU) a graphics processing unit (GPU) or both), a main memory 604 and a static memory 606, which communicate with each other via a bus 608. The computer system 600 may further include a video display unit 610 (e.g., a liquid crystal display (LCD), light emitting diode (LED) or a cathode ray tube (CRT)). The computer system 600 also includes an alphanumeric input device 612 (e.g., a keyboard), a cursor control device 614 (e.g., a mouse), a drive unit 616, a signal generation device 618 (e.g., a speaker) and a network interface device 620.

The drive unit 616 includes a machine-readable medium 622 on which is stored one or more sets of instructions (e.g., software 624) embodying any one or more of the methodologies or functions described herein. The software 624 may also reside, completely or at least partially, within the main memory 604 and/or within the processor 602 during execution thereof by the computer system 600, the main memory 604 and the processor 602 also constituting machine-readable media.

The software 624 may farther be transmitted or received over a network 626 via the network interface device 620.

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine readable medium" shall also be taken to include any medium that is capable of storing, encoding or carrying a set of instructions for execution by the machine and that cause the machine to perform any one or more of the methodologies of the embodiments of the present invention. The term "machine readable medium" shall accordingly be taken to include, but not limited to, solid-state memories, optical and magnetic media, and carrier wave signal, e.g., in a tangible media.

Figure 7:
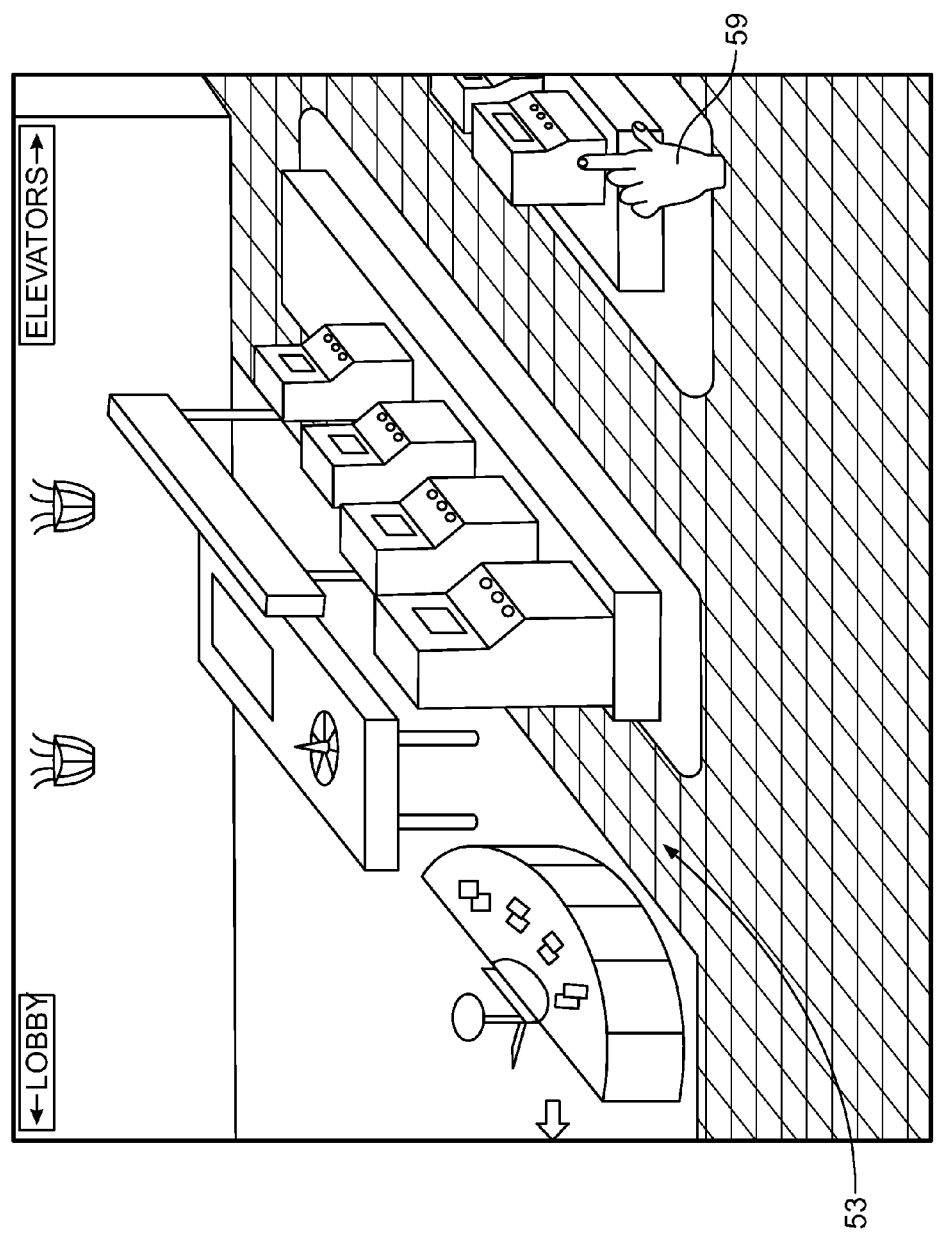
FIG. 7 shows a virtual gaming environment that can be displayed by the wearable display device, according to an example embodiment.

FIG. 7 shows a view of a virtual gaming environment 700 that can include data representing a plurality of gaming machines 400 in the wearable display system so that a gaming floor or environment can by virtually displayed to the wearer of the wearable display. This can simulate the floor of a casino or other establishment where gaming can occur. The wearer can look at any of the plurality of gaming machines 400 in the virtual environment and select one to play.

Figure 8:
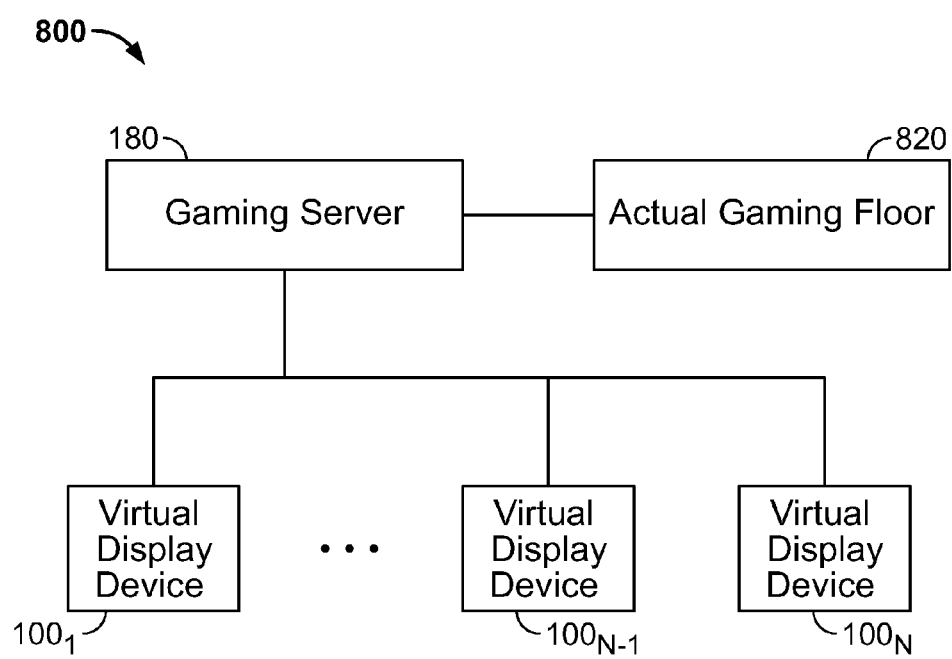
FIG. 8 shows a gaming system that uses the wearable display of the present disclosure.

FIG. 8 shows a gaming system 800 that includes at least one of the display systems 100. Gaming system 800 includes a gaming server that is connected to a real-world (physical) gaming floor and to a plurality of virtual display devices $100_1$-$100_N$. The gaming server 810 can monitor the gaming floor 820 and the display devices 100. Game server can include security features, image data, player tracking, progressive jackpot information, accounting functions and other features used in a gaming business. Gaming system 800 can be a gaming system as described in U.S. Pat. No. 6,884,170, assigned to IGT or Reno, Nev., and incorporated by reference in its entirety for any purpose. However, if U.S. Pat. No. 6,884,170 conflicts with the present explicit disclosure, the present disclosure controls.

Embodiments of the head mounted display (HMD) systems for augmented or virtual reality applications as described herein may overcome various problems with other head mounted displays, for example, a slow refresh rate. A slow refresh rate typically results in a lag between a user turning his head and the display refreshing on the head mounted display. This is largely due to the fact that a conventional display subsystem driving the HMD has to create the view that the user is looking at. Even using powerful computer systems, this usually results in some lag. Additionally, the display subsystems used to drive current HMDs generate a rectangular vision which is then displayed on the HMD. This is not a true representation of the real world and hence does not give the user a true feeling or impression of a real world experience. Embodiments of the presently described systems and methods as invited by the present inventor can overcome these drawbacks by providing for an intermediate graphics buffer system that stores information corresponding to the display to be presented. This graphics buffer is constantly refreshed by the graphics subsystem but is independent of the refresh rate of the display on the HMD. Hence, each time a user turns his head, the data is pulled from the intermediate graphics buffer instead of the graphics subsystem having to refresh the entire display. Additionally, the intermediate graphics buffer uses cube maps instead of rectangular maps to store the information.

Embodiments of the present disclosure systems may use two cube maps (one for each eye) to represent the data for display. These cube maps are created by mapping a sphere on to a cube thereby giving a closer three-dimensional feel to the display. The intermediate graphics buffer also comprises a second set of cube map buffers. The graphics subsystem updates the contents of the second set while the HMD uses the first set to read image data. Once the graphics subsystem has completely refreshed the second set, the HMD then can use this newer set of buffers allowing the first set to be refreshed.

Since the data in the virtual environment, represented in three-dimensions using the cube maps does not change as much as the perspective of the user in the virtual environment, it makes sense to refresh the user's view more frequently than to refresh the actual data.

Embodiments of the present disclosure may be considered to be counter-intuitive as current solutions are trying to increase resolution to the eye whereas this approach may use a reduced resolution (or not seek to increase resolution) to the eye but increases frame rate being displayed to the user.

In the present description the "wearable" and "head mounted" are used to describe the display. It will be recognized the both of the these terms are used to place and hold a virtual related display in front of the eyes of the user.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

This invention is claimed as follows:

1. A wearable display system comprising:
   a wearable display wearable by a person;
   at least one intermediate graphics display buffer configured to receive display data from a graphics engine that is independent of a refresh rate of the wearable display; and
   a display processor configured to use the display data from the at least one intermediate graphic display buffer to cause the wearable display to change at least one image displayed by the wearable display when the head of the person turns.

2. The wearable display system of claim 1, wherein the at least one intermediate graphics display buffer uses a cube map to store the received display data from the graphics engine.

3. The wearable display system of claim 1, wherein the at least one intermediate graphics display buffer uses a plurality of cube maps to store the received display data from the graphics engine.

4. The wearable display system of claim 1, wherein the display processor operates at least 600 HZ, and wherein the at least one intermediate graphics display buffer receives data from the graphics engine at or less than 120 HZ.

5. The wearable display system of claim 1, wherein the wearable display includes a left display and a right display, the wearable display being wearable by the person with the right display in field of view the right eye of the person and the left display in field of view the left eye of the person.

6. The wearable display system of claim 5, wherein the at least one intermediate graphics display buffer includes a left display intermediate graphics display buffer and a right display intermediate graphics display buffer.

7. The wearable display system of claim 6, wherein the left display intermediate graphics display buffer uses a first cube map to store first received display data from the graphics engine, and the right display intermediate graphics display buffer uses a second cube map to store second received display data from the graphics engine.

8. The wearable display system of claim 1, wherein the at least one intermediate graphic display buffer operates with the display processor to provide an effective increased frame rate.

9. A method of operating a wearable display including a display, said method comprising:
   receiving at least one intermediate graphics display buffer display data from a graphics engine that is independent of a refresh rate of the wearable display; and
   causing a display processor to use the display data from the at least one intermediate graphic display buffer to cause the wearable display to change at least one image displayed by the wearable display when the head of the person turns.

10. The method of claim 9, which includes causing the at least one intermediate graphics display buffer to use a cube map to store the received display data from the graphics engine.

11. The method of claim 9, which includes causing the at least one intermediate graphics display buffer to use a plurality of cube maps to store the received display data from the graphics engine.

12. The method of claim 9, which includes causing the display processor to operate at at least 600 HZ, and causing the at least one intermediate graphics display buffer to receive data from the graphics engine at or less than 120 HZ.

13. The method of claim 9, wherein the wearable display includes a left display and a right display, the wearable display being wearable by the person with the right display in field of view a right eye of the person and the left display in field of view a left eye of the person.

14. The method of claim 13, wherein the at least one intermediate graphics display buffer includes a left display intermediate graphics display buffer and a right display intermediate graphics display buffer.

15. The method of claim 14, which includes causing the left display intermediate graphics display buffer to use a first cube map to store first received display data from the graphics engine and the right display intermediate graphics display buffer to use a second cube map to store second received display data from the graphics engine.

16. The method of claim 9, which includes causing the at least one intermediate graphic display buffer to operate with the display processor to provide an effective increased frame rate.

* * * * *